(12) United States Patent
Duranel et al.

(10) Patent No.: US 8,894,911 B2
(45) Date of Patent: *Nov. 25, 2014

(54) LOW MELT FLOW INDEX RESINS FOR INJECTIONS-STRETCH-BLOW-MOULDING

(75) Inventors: Laurent Duranel, Nivelles (BE); Emmanuel Humbeeck, Feluy (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 41 days.

This patent is subject to a terminal disclaimer.

(21) Appl. No.: 12/305,252

(22) PCT Filed: Jun. 20, 2007

(86) PCT No.: PCT/EP2007/056129
§ 371 (c)(1),
(2), (4) Date: Jun. 2, 2009

(87) PCT Pub. No.: WO2007/147845
PCT Pub. Date: Dec. 27, 2007

(65) Prior Publication Data
US 2009/0317576 A1      Dec. 24, 2009

(30) Foreign Application Priority Data

Jun. 21, 2006  (EP) .................................... 06115765

(51) Int. Cl.
| | |
|---|---|
| *B29C 39/02* | (2006.01) |
| *C08F 10/06* | (2006.01) |
| *B29C 49/00* | (2006.01) |
| *B29C 49/12* | (2006.01) |
| *B29C 35/08* | (2006.01) |
| *C08F 210/06* | (2006.01) |
| *B29K 23/00* | (2006.01) |
| *B29C 49/16* | (2006.01) |
| *C08L 23/14* | (2006.01) |
| *B29C 49/06* | (2006.01) |

(52) U.S. Cl.
CPC ................ *C08F 10/06* (2013.01); *B29C 49/12* (2013.01); *B29C 2035/0822* (2013.01); *B29B 2911/1404* (2013.01); *B29C 49/0005* (2013.01); *B29B 2911/1402* (2013.01); *C08F 210/06* (2013.01); *B29K 2023/12* (2013.01); *B29B 2911/14033* (2013.01); *B29B 2911/14106* (2013.01); *B29B 2911/14133* (2013.01); *B29C 49/16* (2013.01); *C08L 2203/02* (2013.01); *C08L 23/142* (2013.01); *B29B 2911/14026* (2013.01); *B29B 2911/14926* (2013.01); *B29B 2911/1498* (2013.01); *B29K 2623/12* (2013.01); *B29B 2911/14326* (2013.01); *B29C 49/06* (2013.01)
USPC ........................ 264/532; 264/537

(58) Field of Classification Search
USPC .................................... 264/532, 537
See application file for complete search history.

(56) References Cited

U.S. PATENT DOCUMENTS

| | | | |
|---|---|---|---|
| 4,005,969 A * | 2/1977 | Farrell ........................... | 425/389 |
| 4,534,930 A * | 8/1985 | Nohara ......................... | 264/513 |
| 5,213,752 A * | 5/1993 | Miyazawa et al. ............ | 264/532 |
| 6,722,868 B1 * | 4/2004 | Evrard .............................. | 425/3 |
| 6,733,717 B1 * | 5/2004 | Marczinke et al. ........... | 264/532 |
| 7,087,680 B2 * | 8/2006 | Pierini et al. ................... | 525/240 |
| 7,581,942 B2 * | 9/2009 | Richards et al. .............. | 425/529 |
| 2004/0026827 A1 * | 2/2004 | Dairanieh et al. ......... | 264/288.4 |
| 2004/0091653 A1 * | 5/2004 | Tai et al. ....................... | 428/35.7 |
| 2005/0058741 A1 * | 3/2005 | Fujii et al. ..................... | 425/529 |
| 2005/0161866 A1 | 7/2005 | Batlaw | |
| 2005/0249904 A1 * | 11/2005 | Batlaw et al. ................ | 428/35.7 |
| 2006/0099364 A1 * | 5/2006 | Harrison et al. .............. | 428/35.7 |
| 2006/0235159 A1 * | 10/2006 | Datta et al. ..................... | 525/240 |
| 2006/0290034 A1 * | 12/2006 | Sideris .......................... | 264/537 |
| 2007/0164488 A1 * | 7/2007 | Jaksztat et al. ................ | 264/523 |
| 2007/0218304 A1 * | 9/2007 | Bourgeois et al. ............ | 428/480 |
| 2008/0044603 A1 * | 2/2008 | Hutchinson et al. ......... | 428/35.7 |
| 2010/0068437 A1 * | 3/2010 | Duranel et al. ............. | 428/36.92 |

FOREIGN PATENT DOCUMENTS

| | | | | |
|---|---|---|---|---|
| CA | 2185475 A1 | | 3/1997 | |
| EP | 0309138 A2 | * | 3/1989 | ............... B65D 1/00 |
| JP | 9220757 A1 | | 8/1997 | |
| JP | 2005008685 A1 | | 1/2005 | |
| WO | WO 95/11791 | | 5/1995 | |
| WO | WO 96/35571 | * | 11/1996 | ............... B29C 49/00 |
| WO | WO 99/41293 | | 8/1999 | |
| WO | 2005074428 A2 | | 8/2005 | |
| WO | WO 2005084920 | * | 9/2005 | ............... B29C 49/48 |
| WO | WO 2006/018777 | | 2/2006 | |

OTHER PUBLICATIONS

Wikipedia at "Melt flow index" (http://en.wikipedia.org/wiki/Melt_flow_index) page last modified Jul. 17, 2010.*
Office Action issued in Japanese Patent Application No. 2009-515869, dated Dec. 12, 2011 (3 pages).

* cited by examiner

*Primary Examiner* — Jeremiah Smith

(57) ABSTRACT

The present invention discloses a method for preparing vials, preferably medical vials by two-stage injection-stretch-blow-molding with a random copolymer of propylene having a melt index MI2 of from 1 to 3 dg/min and an ethylene content of from 2 to 3.5 wt % based on the weight of the resin, and wherein the preform injection temperature is of at least 280° C.

15 Claims, No Drawings

LOW MELT FLOW INDEX RESINS FOR INJECTIONS-STRETCH-BLOW-MOULDING

CROSS-REFERENCE TO RELATED APPLICATIONS

This application claims the benefit of PCT/EP2007/056129, filed Jun. 20, 2007, which claims priority from EP 06115765.7, filed Jun. 21, 2006.

The present invention relates to the preparation of low melt flow polypropylene preforms for two-stage injection-stretch-blow-moulding (ISBM) processes.

EP-A-151741 to Mitsui discloses single-stage manufacturing of articles by ISBM. These articles are prepared from propylene-ethylene random copolymers having a melt flow index of from 4 to 50 dg/min and containing a nucleating agent. The injection moulding temperature is of from 200 to 260° C. and all examples have been carried out with an injection moulding temperature of 220° C.

WO95/11791 to Bekum is directed to a two-stage process for preparing articles by ISBM. The preferred resin is an ethylene-propylene copolymer containing more than 50 wt % of propylene and having a melt index of from 10 to 20 dg/min. The injection cavity fill rate is of from 3 to 5 grams per second and the injection temperature is of about 210° C.

WO05/074428 to Milliken discloses a two-stage process for preparing articles by ISBM. The resin is a polypropylene composition having a melt flow index of from 6 to 50 dg/min, preferably from 13 to 35 dg/min prepared by any method known in the art. The mould fill rate is larger than 5 grams per second and the preform articles have sidewalls having a maximum thickness of less than 3.5 mm. The injection temperatures cited in the examples are of 230 and 240° C.

WO99/41293 to BASF discloses the use of metallocene-produced homo- or copolymers of propylene in ISBM. The range of melt indexes is broadly defined from 0.1 to 1000 dg/min and the injection temperature is of from 200 to 280° C. The polydispersity index of metallocene-prepared polypropylene is very narrow.

None of these resins produce articles having an ideal balance of properties.

It is an aim of the present invention to produce medical vials by two-stage injection-stretch-blow-moulding.

It is another aim of the present invention to provide a method that uses low melt flow polypropylene resins for preparing preforms for injection-stretch-blow-moulding in order to prepare medical vials having excellent optical properties after bi-orientation.

It is also an aim of the present invention to produce medical vials having good thickness distribution.

It is a further aim of the present invention to produce medical vials having good stacking properties.

It is yet another aim of the present invention to produce medical vials having excellent drop test, especially at low temperature.

Any one of these aims is fulfilled, at least partially, by the present invention.

Accordingly, the present invention discloses vials, preferably medical vials prepared by two-stage injection-stretch-blow-moulding with random copolymers of propylene and ethylene having a melt flow index MI2 of from 1 to 3 dg/min, an ethylene content lower than 3.5 wt % based on the weight of the polymer and wherein the preform injection temperature is of at least 280° C.

The present invention also comprises the method for preparing the preforms, the preforms so obtained, the use of said preforms for preparing medical vials, and the medical vials prepared from said preforms.

The melt flow index MI2 is measured following the method of standard test ISO 1133 under a load of 2.16 kg and at a temperature of 230° C.

Preferably, the polypropylene resin used in the present invention is prepared with a Ziegler-Natta (ZN) catalyst system. ZN catalyst systems inherently produce polymers having a broad polydispersity index. The polydispersity index is defined as the ratio Mw/Mn of the weight average molecular weight Mw over the number average molecular weight Mn. Molecular weights are measured by Gel Permeation Chromatography (GPC). Ziegler-Natta catalyst system typically produce polymers having a polydispersity index of at least 6. For sake of clarity, it is repeated that metallocene and single-site catalysts are not ZN catalysts.

The resin is a random copolymer of propylene. The preferred comonomer is ethylene and the amount of ethylene present in the resin is of at most 3.5 wt %, preferably at most 3 wt %, and the preferred minimum is of 1 wt %.

The melt index is of at most 3 dg/min. The preferred minimum MI2 is of 1.5 dg/min; the preferred maximum MI2 is of 2.5 dg/min, more preferably of 2 dg/min.

This type of low melt flow resin is generally not used in injection-stretch-blow-moulding applications and the injection-stretch-blow-moulding conditions are thus adapted to work with that resin.

The resin may additionally contain up to 5000 ppm of nucleating agent Preferably, if present, the nucleating agent is used in an amount of from 200 to 2500 ppm.

Other additives typically employed in the field may be added, such as antioxidants or antistatic.

In addition the present resin is one of the few resins accepted for medical applications. When the invention is used to prepare medical vials, nucleating agents must be selected among those that are accepted in medical applications, such as talc and sodium benzoate. More preferably, there is no nucleating agent. Other additives allowed in medical applications such as for example those described in European Pharmacopoeia §3.1.6 may be added.

The injection temperature for preparing the preform is of at least 280° C., preferably at least 320° C. and more preferably of at least 330° C. There is no absolute maximum, provided the additive package is adapted, as is commonly known in the art. Typically however, the maximum will not exceed 350° C.

The injection temperature is preferably increased for the lower melt index in order to avoid excessive stress. Increasing the injection temperature allows to increase the injection rate without increasing the stress.

At a specified injection temperature, the mould filling rate over gate diameter ratio is of at most 10 cc/s/mm, preferably 8 cc/s/mm. It is of at least 5 cc/s/mm. The gate diameters that are typically used in the field are of from 1.2 to 4 mm, preferably this invention uses gate diameters of from 1.25 to 3 mm.

The stress built in the preform plays an important role on the transparency and impact properties of the finished articles.

The injection-stretch-blow-moulding can be carried out either in a two-stage process carried out on two separate machines (cold cycle), or in a single-stage process carried out on a single machine (hot cycle). In the present invention, the two-stage process is used and it is typically carried out in two separate locations. It comprises the steps of:

providing a preform by injection moulding on a multi-cavity mould;

cooling the preform to room temperature;

transporting the preform to the stretch-blow moulding machine;

re-heating the preform in the stretch-blow moulding machine;

optionally passing the heated preform through an equilibration zone to allow the heat to disperse evenly through the preform wall;

optionally, submitting the preform to a pre-blow step;

stretching the preform axially by a centre rod and simultaneously orienting the stretched preform radially by high pressure air.

Preferably, the re-heating step is carried out in a reflective radiant heat oven following a pre-determined temperature profile adapted to the preform.

In this process, the stretching step is a critical step and it requires preforms made by an optimised process in order to obtain the best properties of the final article.

The preforms are re-heated in an infrared oven following a heating profile. The energy typically necessary in the reheat step is of 28 to 40 kW, preferably of 30 to 36 kW for a system producing about 1500 articles per cavity per hour. Typical re-heating temperatures are of from 90 to 140° C.

The pre-blow pressure is generally of from 2 to 8 bars, preferably of from 4 to 6 bars. The stretching is then typically carried out under a blowing pressure of from 5 to 40 bars, preferably of from 8 to 30 bars and most preferably of from 15 to 20 bars. The stretch rod speed is of from 1000 to 2000 mm/s, preferably of from 1400 to 1800 mm/s and most preferably of about 1600 mm/s. The stretch rod diameter depends upon the size of the preform. The best results for material distribution in the finished article are obtained when the rod diameter is about ⅔ of that of the preform. For example, for a preform having a diameter of 25 mm, the preferred rod diameter is of about 16 mm.

Improved impact strength vials with superior stiffness and transparency are particularly adapted for medical applications. The new bottle of the present invention can advantageously replace standard glass bottle, saving weight and energy for its production and transportation. Furthermore, in line optical control of the solution contained into the medical vials can readily be applied due to the glass-clear quality of the containers produced by the present process. In addition the new bottles are safer than conventional polypropylene blow moulded bottles container because they are produced without the welding line at the vial's bottom, typical of blow moulding process, that can lead formation of leaks and would thus require additional quality control. Indeed polypropylene resins have poor welding properties because of their high melt temperature.

The medical vials prepared with the preforms of the present invention have remarkable optical properties: they have an excellent transparency throughout their whole body or at least throughout most of their body. In addition they have good wall thickness distribution, excellent drop test and very good top load and stacking properties. They also have a number of desirable properties such as for example low water vapour permeability, good squeezability, and excellent heat resistance allowing for example hot filling, microwave heating or sterilisation.

The properties of the medical vials are illustrated by the following examples that are not intended to limit the scope of the invention.

EXAMPLES

Several random copolymers of propylene prepared with a Ziegler-Natta catalyst system have been tested. R1 is a reference resin typically used in ISBM. R2 is a low melt flow resin according to the present invention. Their properties are summarised in Table 1.

TABLE 1

| Resin | R1 | R2 |
|---|---|---|
| C2 (wt %) | 3.3 | 2.8 |
| MI2 (dg/min) | 10 | 1.8 |
| anti-oxidants (ppm) | 1000 | 934 |
| nucleating agent (ppm) | 250 | 0 |
| Tm (° C.) | 146 | 149 |
| Tc start (° C.) | 132.3 | 109 |
| Tc peak (° C.) | 117.3 | 105 |

Tm and Tc represent respectively the melting and crystallisation temperatures.

The preforms were prepared from these resins on a Arburg 370 machine having a single cavity mould: they had a weight of 16.5 g and they were used to prepare 500 mL bottles having a wall thickness of about 300 μm.

The wall thickness distribution was improved by decreasing the melt index and thus by consequently increasing the injection temperature. The wall thickness was measured at three different points along the height of the bottle and for each height at four different points along the circumference of the bottle, at 90° from one another.

The polypropylene bottles of the prior art all showed an uneven wall thickness distribution. The thickness was rather constant along the circumference of the bottle but varied with height. In the bottles of the present invention, the thickness variation as a function of height is considerably reduced and they have a much better thickness distribution than those of the prior art, thereby making them more resistant to stacking or dynamic compression. The results are presented in Table 2.

TABLE 2

| | RESIN | |
|---|---|---|
| Thickness distribution | R1 | R2 |
| Top (μm) | 750 | 300 |
| Middle (μm) | 300 | 340 |
| Bottom (μm) | 280 | 310 |

Dynamic compression tests were also carried out on the same empty open bottles, using the method of standard test ASTM D 2659-95. The results are displayed in Table 3.

Drop tests allow drop heights of up to 6 m. The bottles are dropped vertically on a metal plate presenting a slope of 15°. The tests were carried out at room temperature (23° C.) with bottles filled with water and stored for 48 hours at room temperatures. The maximum height H without breakage, expressed in m, is also given in Table 3. It represents the height at which 50% of the tested samples broke.

The transparency was quantified by the haze measured using the method of standard test ASTM D 1003 for bottles having a wall thickness of about 300=300 μm μm. The results are displayed in Table 3.

TABLE 3

| | RESIN | |
|---|---|---|
| | R1 | R2 |
| Dynamic compression, speed = 50 mm/min | | |
| Strength at yield (N) | 114.5 | 109.2 |
| Displacement at yield (mm) | 6.85 | 6.59 |
| Drop test at 23° C. | | |
| H (m) | >6 | >6 |
| Haze at middle of bottles | | |
| % | 7 | 8.8 |

The bottles of the present invention, prepared from a low melt flow resin have a much better wall thickness distribution than those of the prior art and have optical and mechanical properties equivalent to those of the prior art.

The invention claimed is:

1. A method for preparing vials comprising:
providing a Ziegler-Natta formed random copolymer of propylene and from 2 to 3.5 wt. % ethylene exhibiting a melt index ($MI_2$) of from 1 to 3 dg/min., wherein an entirety of the random copolymer is prepared with a Ziegler-Natta catalyst; and
two-stage injection-stretch-blow-moulding the random copolymer to form a vial, wherein the two-stage injection-stretch-blow-moulding includes forming a preform at a preform injection temperature of at least 330° C. and a mould filling rate over gate diameter ratio that is at least 5 cc/s/mm; and wherein the two-stage-stretch-blow moulding comprises the following steps:
providing the preform by injection moulding on a multi-cavity mould;
cooling the preform to room temperature;
transporting the preform to the stretch-blow moulding machine;
re-heating the preform in the stretch-blow moulding machine;
optionally passing the heated preform through an equilibration zone to allow the heat to disperse evenly through the preform wall;
optionally, submitting the preform to a pre-blow step; and
stretching the preform axially by a centre rod and simultaneously orienting the preform radially by high pressure air, wherein a ratio of the centre rod diameter to the diameter of the preform is within 3% of 2/3.

2. The method of claim 1, wherein the preform injection temperature is between 330° C. to 350° C. and the mould filling rate over gate diameter ratio is less than or equal to 10 cc/s/mm.

3. The method of claim 2, wherein the melt index is of from 1.5 to 2.5 dg/min.

4. The method of claim 2, wherein the perform is reheated in an infrared oven with an energy of from 28 to 40 kW for an output of 1500 bottles per hour.

5. The method of claim 2, wherein the random copolymer exhibits a polydispersity index of at least 6.

6. The method of claim 2, wherein the random copolymer comprises talc or sodium benzoate.

7. The method of claim 6, wherein the talc or sodium benzoate is present in an amount up to 5000 ppm.

8. The method of claim 6, wherein the talc or sodium benzoate is present in an amount ranging from 200 to 2500 ppm.

9. The method of claim 2, wherein the random copolymer comprises no nucleating agent.

10. The method of claim 1, wherein the perform is reheated in an infrared oven at a temperature of between 90 to 140° C.

11. The method of claim 1, wherein the pre-blow pressure is from 4 to 6 bars.

12. The method of claim 1, wherein stretching pressure is from 15 to 20 bars.

13. The method of claim 1, wherein the stretch rod speed is between 1400 and 1800 mm/s.

14. The method of claim 1, wherein the optional step of passing the heated preform through the equilibration zone to allow the heat to disperse evenly through the preform wall is performed.

15. The method of claim 1, wherein the optional step of submitting the preform to the pre-blow step is performed.

* * * * *